(12) United States Patent
Lin et al.

(10) Patent No.: US 7,951,629 B2
(45) Date of Patent: *May 31, 2011

(54) PIXEL STRUCTURE AND MANUFACTURING METHOD THEREOF

(75) Inventors: Hsiang-Lin Lin, Hsinchu (TW);
Sung-Kao Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,537

(22) Filed: Feb. 12, 2010

(65) Prior Publication Data
US 2010/0144071 A1   Jun. 10, 2010

Related U.S. Application Data

(63) Continuation-in-part of application No. 11/863,283, filed on Sep. 28, 2007, now Pat. No. 7,687,289.

(30) Foreign Application Priority Data

Mar. 27, 2007  (TW) ................................ 96110489 A
Jul. 30, 2007  (TW) ................................ 96127759 A

(51) Int. Cl.
 *H01L 21/00* (2006.01)
(52) U.S. Cl. ............ 438/30; 438/149; 438/161; 257/59; 257/72; 257/E27.13; 257/E33.001

(58) Field of Classification Search .................... 438/30, 438/149, 151; 257/59, 72, E27.13, E33.001
See application file for complete search history.

(56) References Cited

U.S. PATENT DOCUMENTS

| 7,338,846 B2 * | 3/2008 | Su et al. ...................... 438/158 |
| 2007/0236625 A1 * | 10/2007 | Wang et al. ...................... 349/54 |
| 2008/0064150 A1 * | 3/2008 | Liou et al. ...................... 438/158 |
| 2008/0111138 A1 * | 5/2008 | Lin et al. ...................... 257/79 |
| 2008/0128700 A1 * | 6/2008 | Su et al. ...................... 257/59 |

* cited by examiner

*Primary Examiner* — Matthew Smith
*Assistant Examiner* — John M Parker
(74) *Attorney, Agent, or Firm* — Jianq Chyun IP Office

(57) ABSTRACT

A method of manufacturing a pixel structure is provided. A first patterned conductive layer including a gate and a data line is formed on a substrate. A gate insulating layer is formed to cover the first patterned conductive layer and a semiconductor channel layer is formed on the gate insulating layer above the gate. A second patterned conductive layer including a scan line, a common line, a source and a drain is formed on the gate insulating layer and the semiconductor channel layer. The scan line is connected to the gate and the common line is located above the data line. The source and drain are located on the semiconductor channel layer, and the source is connected to the data line. A passivation layer is formed on the substrate to cover the second patterned conductive layer. A pixel electrode connected to the drain is formed on the passivation layer.

10 Claims, 13 Drawing Sheets

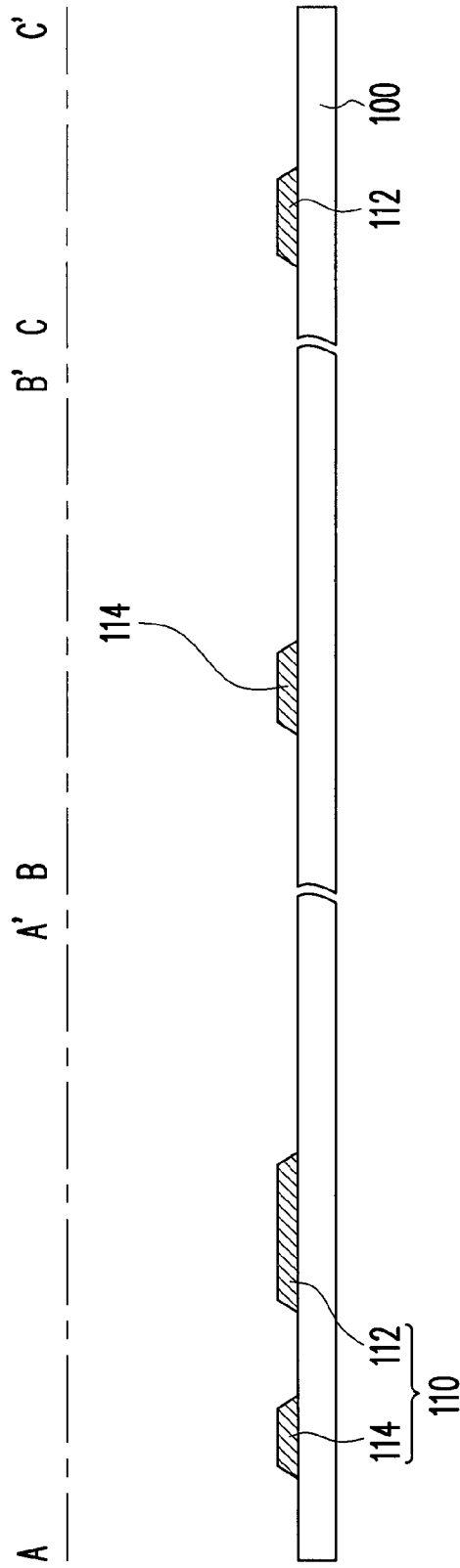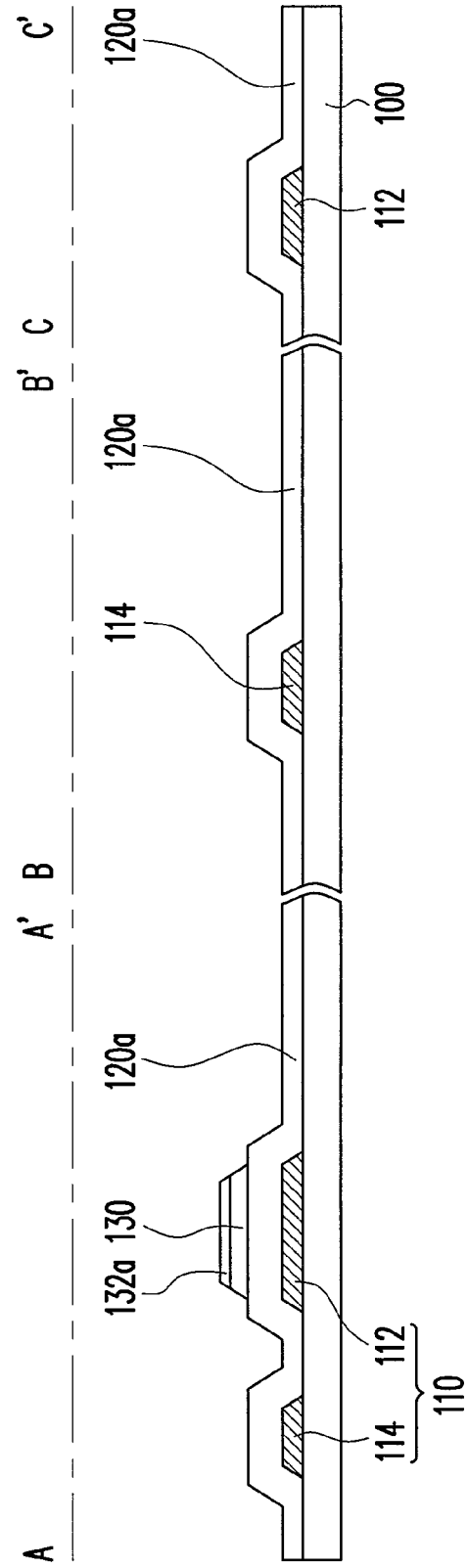

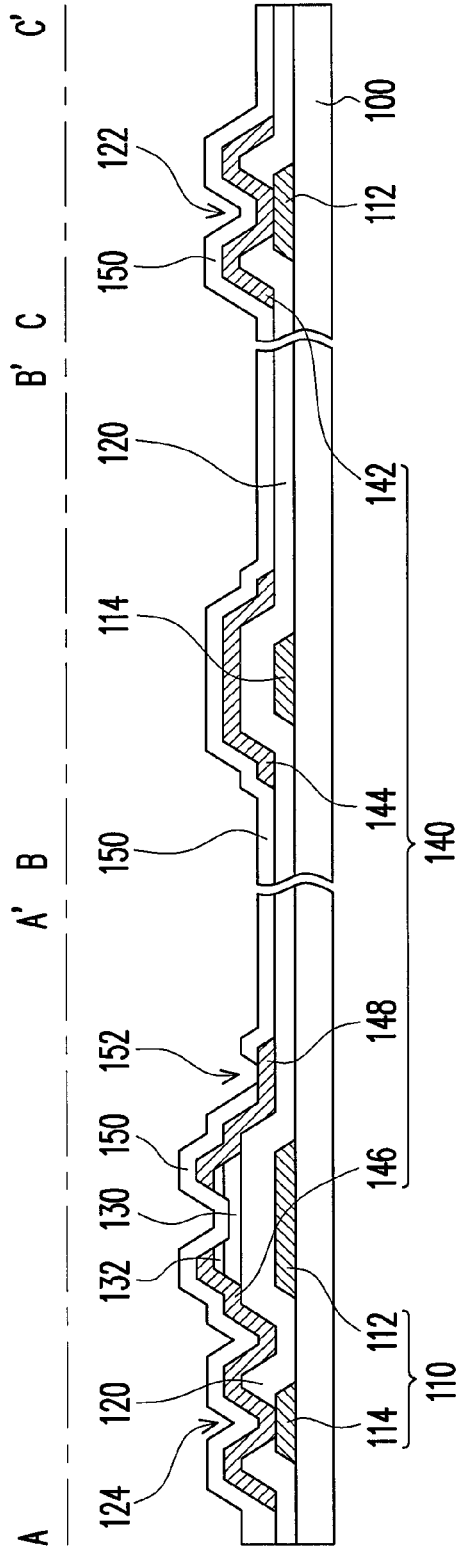
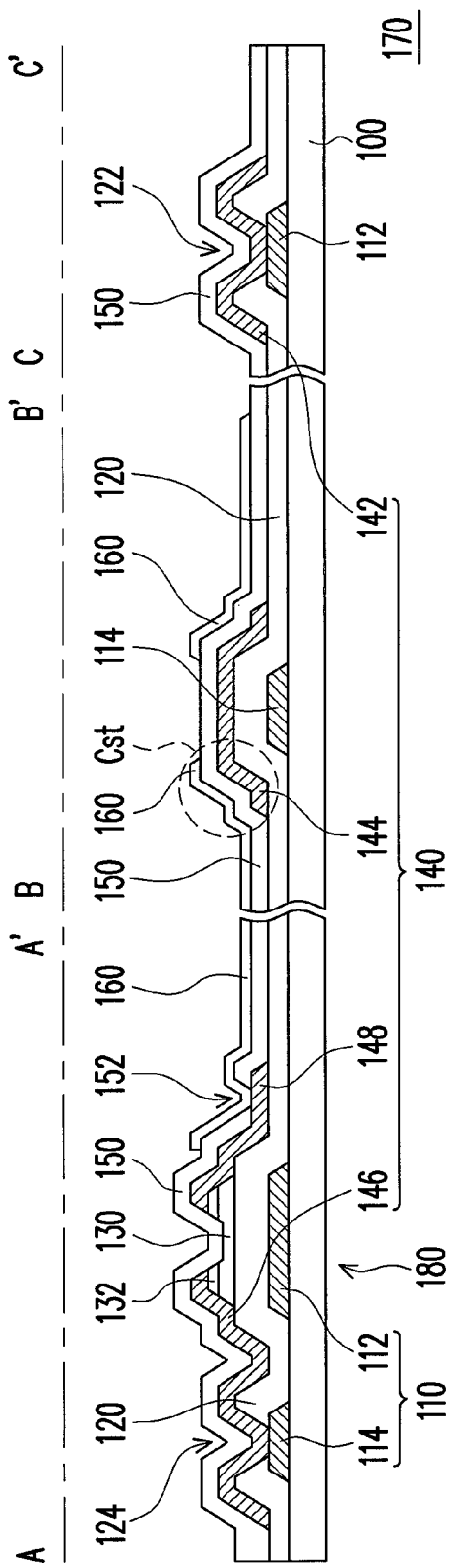

PIXEL STRUCTURE AND MANUFACTURING METHOD THEREOF

CROSS-REFERENCE TO RELATED APPLICATION

This application is a continuation application of U.S. application Ser. No. 11/863,283 filed on Sep. 28, 2007, which claims the priority benefits of Taiwan applications serial no. 96110489, filed Mar. 27, 2007 and serial no. 96127759, filed Jul. 30, 2007. All disclosures of the Taiwan applications are incorporated herein by reference.

BACKGROUND OF THE INVENTION

1. Field of the Invention

The present invention relates to a pixel structure and a manufacturing method thereof, and more particularly to a pixel structure with high aperture ratio and a manufacturing method thereof.

2. Description of Related Art

In daily life during a 3C era, various information equipments, e.g. digital tools such as mobile phones, digital cameras, digital video cameras, notebook computers, and desktop computers are available in the market, which are developed in a trend of convenience, multi-functions, and chic appearance. In most of the information equipments, flat panel displays are used as main communication interfaces. Through a display function of the flat panel displays, the operation of the products becomes more convenient to the user. Due to the advantages of power saving, high picture quality, preferred space utilization efficiency, low consumption of power, no radiation, liquid crystal displays (LCD) have become a mainstream product in the market.

Generally, a pixel structure of the LCD includes a scan line, a data line, an active element, and a pixel electrode. In the pixel structure, a capacitance ($C_{pd}$) between pixel electrode and a data line is one of factors affecting an aperture ratio. More specifically, when the distance between the data line and the pixel electrode is shortened, the capacitance ($C_{pd}$) between the data line and the pixel electrode is increased accordingly. In order to avoid a cross talk caused by the capacitance ($C_{pd}$) between the data line and the pixel electrode, the data line is always designed to be separated from the pixel electrode for a distance, so as to reduce the vertical cross talk. However, the longer the distance between the data line and the pixel electrode is, the more greatly the aperture ratio of the pixel decreases.

In order to reduce the cross talk of the pixel structure and maintain the aperture ratio of the pixel structure at a certain level, many pixel structures has been developed. For example, a thicker insulator layer can be disposed between the pixel electrode and the data line to reduce the effect of capacitance. However, the material of insulator layer is usually an organic material such as acrylic resin, which is liable to absorb moisture and thus the adhesion is weakened. Besides, the organic material cannot be completely bleached in the process, and thus the overall transmittance of the pixel structure is reduced.

SUMMARY OF THE INVENTION

The present invention is directed to provide a method of manufacturing a pixel structure, so as to reduce a cross talk occurred between a pixel electrode and a data line.

The present invention is also directed to providing a pixel structure with high aperture ratio.

As broadly described and embodied herein, a method of manufacturing a pixel structure includes the following steps. First, a first patterned conductive layer including a gate, a connection layer located at one side of the gate and a data line is formed on a substrate. Next, a gate insulating layer is formed on the substrate to cover the first patterned conductive layer and a semiconductor channel layer is formed on the gate insulating layer above the gate. Then, a second patterned conductive layer including a scan line, a common line, a source and a drain is formed on the gate insulating layer and the semiconductor channel layer. The scan line is electrically connected to the gate, and the common line is located above the data line. The source and the drain are located on the semiconductor channel layer, and the source is electrically connected to the data line. Afterwards, a passivation layer is formed on the substrate to cover the second patterned conductive layer. Then, a pixel electrode electrically connected to the drain is formed on the passivation layer.

In an embodiment of the present invention, the pixel electrode and the common line are partially overlapped to form a storage capacitor.

In an embodiment of the present invention, the method of forming the semiconductor channel layer includes first forming a semiconductor layer on the gate insulating layer, performing a deposition and/or doping process to form an ohmic contact layer on the upper surface of the semiconductor layer, and patterning the semiconductor layer to form the semiconductor channel layer.

In an embodiment of the present invention, the method of forming the gate insulating layer includes, for example, first forming a first dielectric layer on the substrate, and forming a first contact window and a second contact window in the first dielectric layer to expose a part of the gate and the data line respectively.

In an embodiment of the present invention, the scan line is electrically connected to the gate via the first contact window.

In an embodiment of the present invention, the source is electrically connected to the data line via the second contact window.

In an embodiment of the present invention, the step of forming the passivation layer includes first forming a second dielectric layer on the substrate to cover the second patterned conductive layer, and forming a third contact window in the second dielectric layer to expose a part of the drain.

In an embodiment of the present invention, the pixel electrode is electrically connected to the drain via the third contact window.

In an embodiment of the present invention, the method of manufacturing the pixel structure further includes the following steps. After the semiconductor channel layer is formed and before the second patterned conductive layer is formed, a fourth contact window is further formed in the gate insulating layer to expose a part of the connection layer, such that after the second patterned conductive layer is formed, the drain is electrically connected to the connection layer via the fourth contact window.

In an embodiment of the present invention, the method of manufacturing the pixel structure further includes the following steps. After the passivation layer is formed and before the pixel electrode is formed, a fifth contact window is formed in the passivation layer and the gate insulating layer to expose a part of the connection layer, such that after the pixel electrode is formed, the pixel electrode is electrically connected to the connection layer via the fifth contact window.

As broadly described and embodied herein, a pixel structure disposed on the substrate is also provided. The pixel structure includes a first patterned conductive layer, a gate insulating layer, a semiconductor channel layer, a second patterned conductive layer, a passivation layer, and a pixel electrode. The first patterned conductive layer includes a gate and a data line, and the gate insulating layer covers the first patterned conductive layer. The semiconductor channel layer is formed on the gate insulating layer above the gate, and the second patterned conductive layer is located on the gate insulating layer and the semiconductor channel layer. The second patterned conductive layer includes a scan line, a common line, and a source and a drain. The scan line is electrically connected to the gate, and the common line is located above the data line. The source and the drain are located on the semiconductor channel layer, and the source is electrically connected to the data line. Moreover, the passivation layer covers second patterned conductive layer, and the pixel electrode electrically connected to the drain is disposed on the passivation layer.

In an embodiment of the present invention, the upper surface of the semiconductor channel layer further includes an ohmic contact layer.

In an embodiment of the present invention, the above gate insulating layer has a first contact window and a second contact window respectively located above the gate and the data line. Meanwhile, the scan line is electrically connected to the gate via the first contact window, and the source is electrically connected to the data line via the second contact window.

In an embodiment of the present invention, the above passivation layer has a third contact window located above the drain, and the pixel electrode is electrically connected to the drain via the third contact window.

In an embodiment of the present invention, the first patterned conductive layer further includes a connection layer located below the drain and the pixel electrode. In addition, the gate insulating layer, for example, has a fourth contact window, such that the drain is electrically connected to the connection layer via the fourth contact window. Moreover, the passivation layer and the gate insulating layer, for example, have a fifth contact window, such that the pixel electrode is electrically connected to the connection layer via the fifth contact window.

As broadly described and embodied herein, a pixel structure disposed on the substrate is further provided. The pixel structure includes a first patterned conductive layer, a gate insulating layer, a semiconductor channel layer, a second patterned conductive layer, a passivation layer, and a pixel electrode. The first patterned conductive layer is disposed on the substrate, and at least includes a gate and a connection layer. The gate insulating layer covers the first patterned conductive layer. The semiconductor channel layer is disposed on the gate insulating layer above the gate. The second patterned conductive layer is disposed on the gate insulating layer and the semiconductor channel layer, and at least includes a source and a drain. The first patterned conductive layer, the semiconductor channel layer, and the second patterned conductive layer form a thin film transistor, and a data line and a scan line which are electrically connected to the thin film transistor. The passivation layer covers second patterned conductive layer. The pixel electrode is disposed on the passivation layer and electrically connected to the drain via the connection layer.

In an embodiment of the present invention, the data line includes a first segment and a second segment. The first segment is constituted by a part of the first patterned conductive layer, and the second segment is constituted by the second patterned conductive layer and is electrically connected to the first segment.

As broadly described and embodied herein, an LCD panel including a first substrate, a second substrate, and a liquid crystal layer is further provided. The first substrate includes a pixel structure as described in any one of the above embodiments, and the second substrate is opposite to the first substrate. Meanwhile, the liquid crystal layer is disposed between the first substrate and the second substrate.

In the pixel structure and the manufacturing method thereof of the present invention, the common line is formed between the pixel electrode and the data line, so as to reduce the capacitance between the pixel and the data line and increase the aperture ratio of the pixel structure. Moreover, in the present invention, when the first patterned conductive layer is formed, a connection layer is formed for electrically connecting the pixel electrode and the drain. In this manner, the case that the line is broken will not occur between the pixel electrode and the drain, and when the pixel structure of the present invention is applied in an LCD, the common line located above the connection layer facilitates the orientation of the liquid crystal molecules.

In order to make the aforementioned and other objectives, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A to 2F are cross-sectional views of FIGS. 1A to 1F taken along section lines AA', BB', and CC', respectively.

DESCRIPTION OF EMBODIMENTS

FIGS. 1A to 1F are schematic top views of a method of manufacturing a pixel structure according to an embodiment of the present invention, and FIGS. 2A to 2F are cross-sectional views of FIGS. 1A to 1F taken along section lines AA', BB', and CC', respectively. The method of manufacturing the pixel structure of this embodiment includes the following steps. First, referring to FIGS. 1A and 2A, a first patterned conductive layer 110 including a gate 112 and a data line 114 is formed on the substrate 100. The method of forming the first patterned conductive layer 110 includes first forming a first conductive layer (not shown) on the substrate 100, and patterning the first conductive layer (not shown).

In this embodiment, the substrate 100 is, for example, a light transmissive substrate such as a glass substrate or a plastic substrate, and the material of the first patterned conductive layer 110 is Al, Cu, Mo, Ag, or Au, or an alloy, a multiple metal layer, or a composite metal layer of the above metals.

Figure 1A:
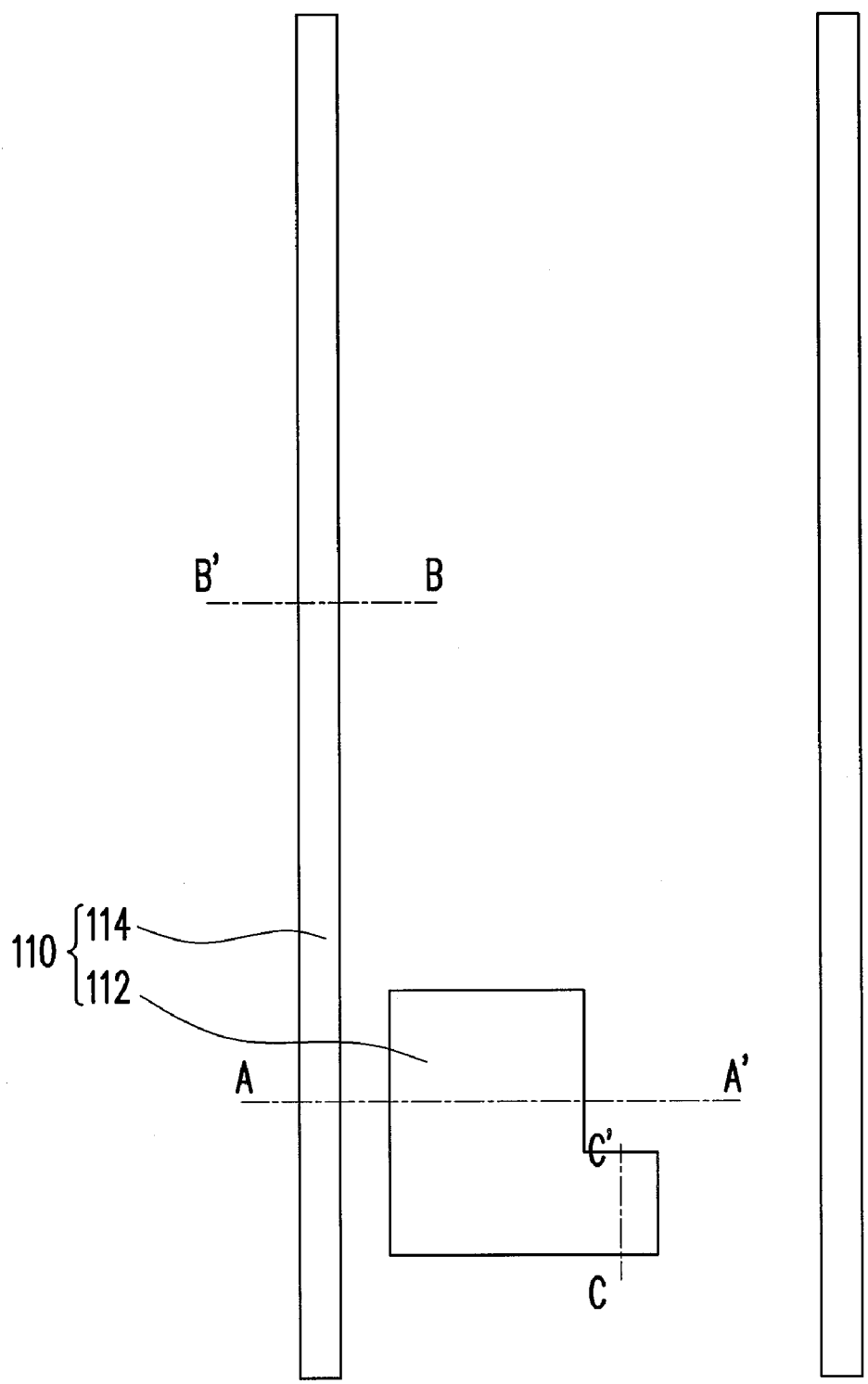
FIGS. 1A to 1F are schematic top views of a method of manufacturing a pixel structure according to an embodiment of the present invention.
Figure 1B:
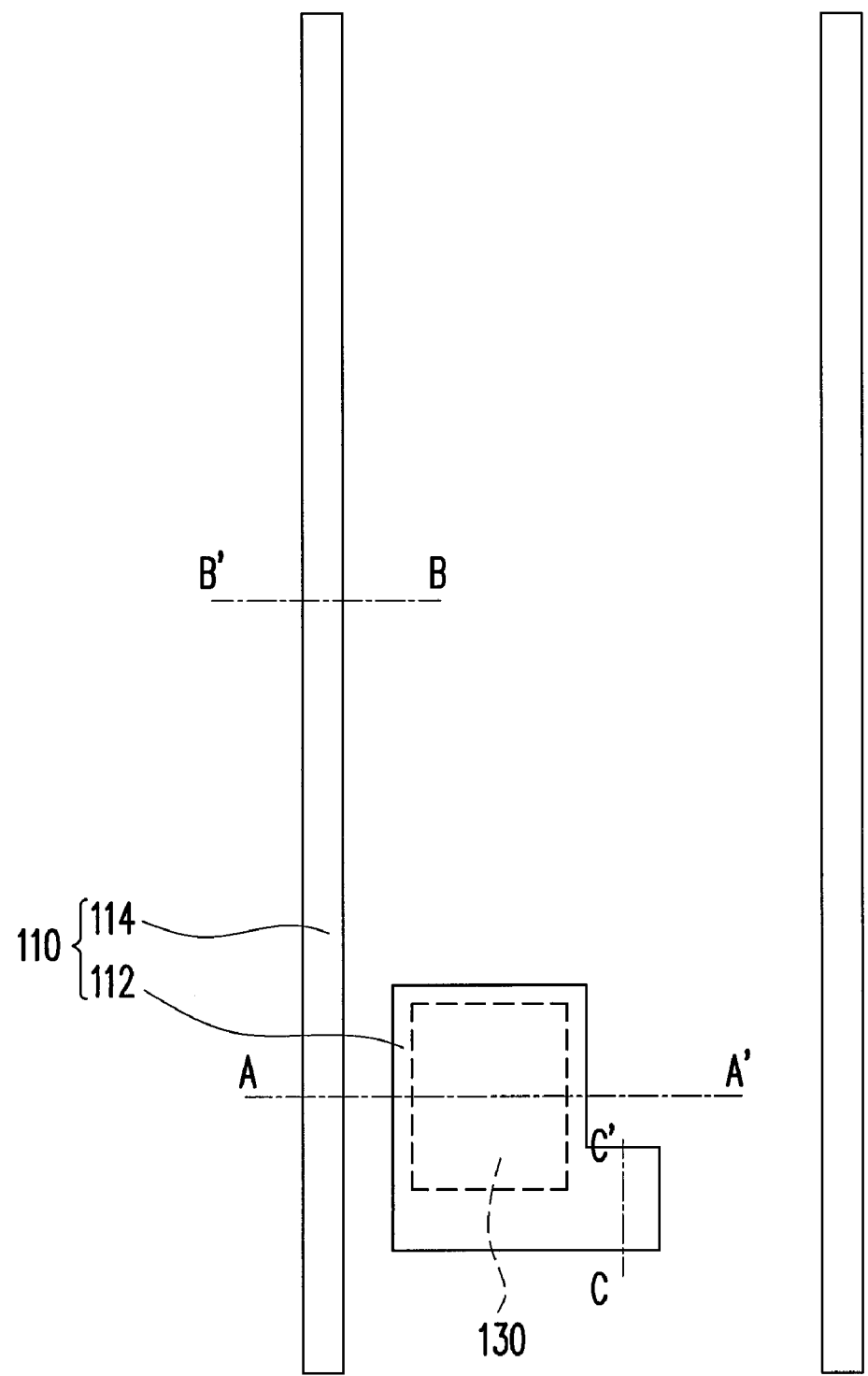

Then, referring to FIGS. 1B and 2B, a first dielectric layer 120a is formed on the substrate 100 to cover the first patterned conductive layer 110, and a semiconductor channel layer 130 is formed on the first dielectric layer 120a above the gate 112. In this embodiment, the method of forming the first dielectric layer 120a is, for example, chemical vapor deposition (CVD). For example, the material of the first dielectric layer 120a is a dielectric material such as silicon dioxide, silicon nitride, or silicon oxynitride.

Furthermore, the method of forming the semiconductor channel layer 130 includes the following steps. First, a semiconductor layer (not shown) such as amorphous silicon is formed on the gate insulating layer 120, and a doping process is performed to form a doped semiconductor layer (not shown) such as an N+ doped semiconductor layer on the upper surface of the semiconductor layer (not shown). Then, the semiconductor layer (not shown) is patterned to form the semiconductor channel layer 130 above the gate 112 and a patterned doped semiconductor layer 132a.

Figure 1C:
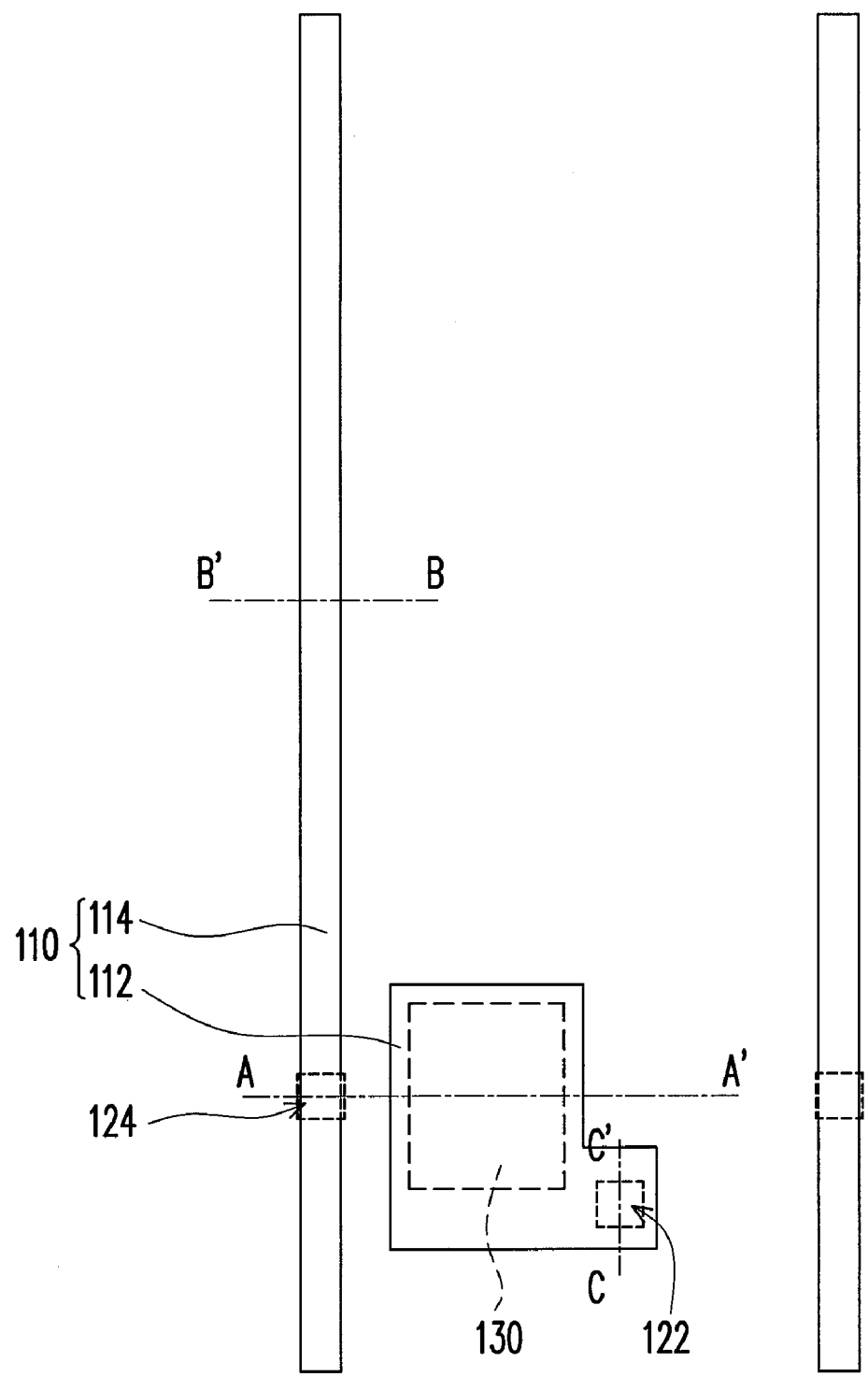
Figure 2C:
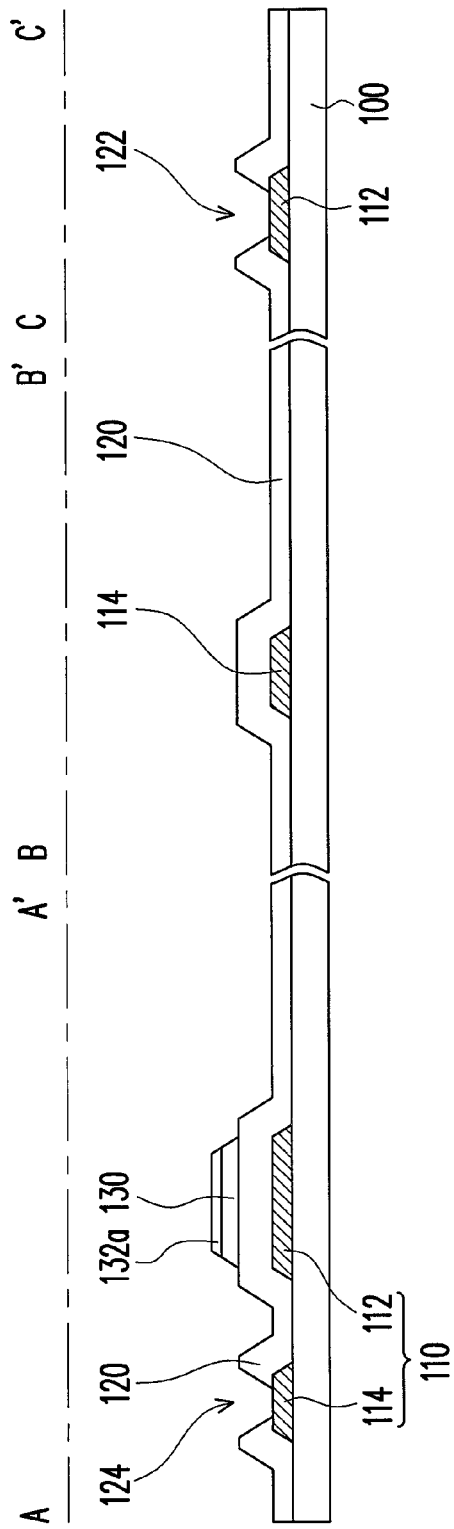

Then, referring to FIGS. 1C and 2C, a first contact window 122 and a second contact window 124 are formed in the first dielectric layer 120a, so as to form the gate insulating layer 120. As shown in FIGS. 1C and 2C, the first contact window 122 exposes a part of area of the gate 112, and the second contact window 124 exposes a part of area of the data line 114. In this embodiment, the first contact window 122 and the second contact window 124 in the first dielectric layer 120a are formed by, for example, a lithographic etching process.

Figure 1D:
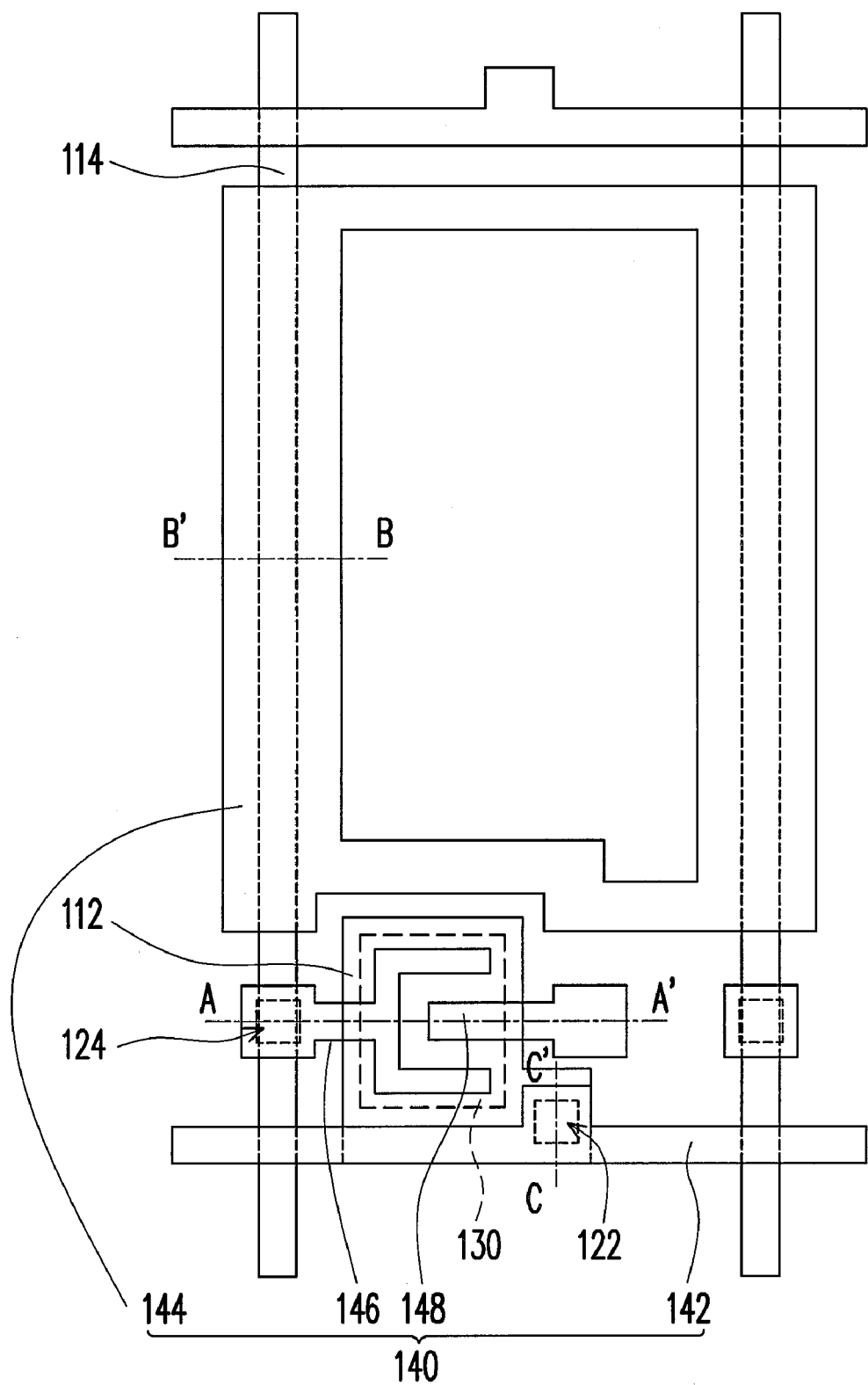
Figure 2D:
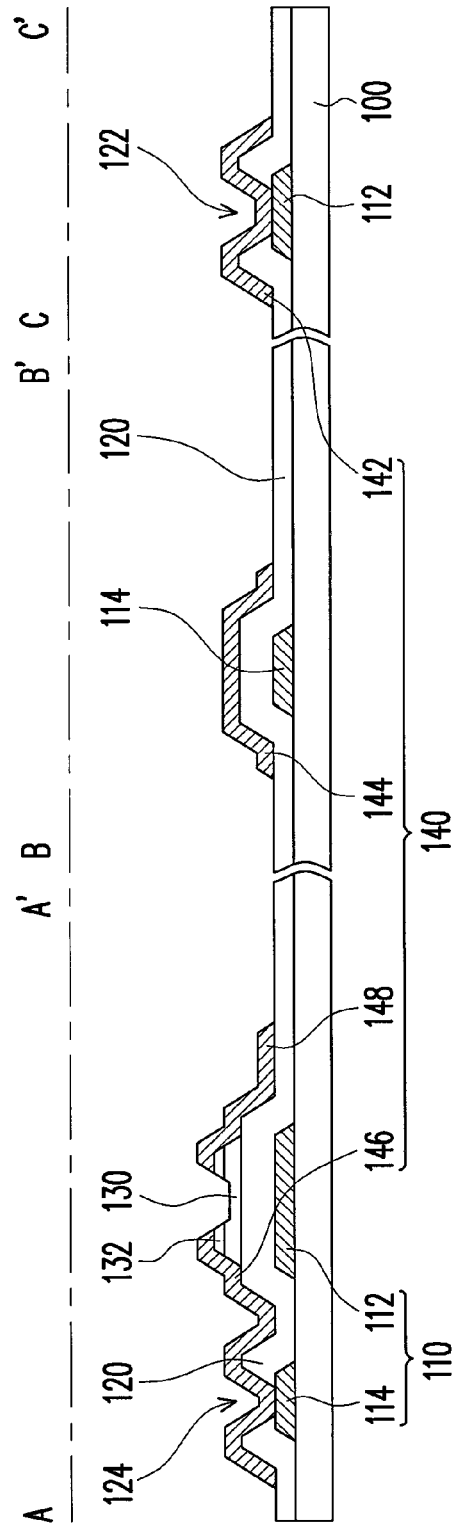

Then, referring to FIGS. 1D and 2D, a second patterned conductive layer 140 is formed on the gate insulating layer 120, the semiconductor channel layer 130, and the patterned doped semiconductor layer 132a. In specific, the method of forming the second patterned conductive layer 140 includes, for example, forming a second conductive layer (not shown) on the gate insulating layer 120 and the semiconductor channel layer 130, and patterning the second conductive layer (not shown) to form the second patterned conductive layer 140. It should be noted that, when the second conductive layer (not shown) is patterned, a part of the patterned doped semiconductor layer 132a is removed. In specific, after the second conductive layer (not shown) is patterned, a scan line 142, a common line 144, a source 146, and a drain 148 are formed, and the patterned doped semiconductor layer 132a not covered by the source 146 and the drain 148 is removed to form an ohmic contact layer 132 until a part of the semiconductor channel layer 130 is exposed.

As shown in FIGS. 1D and 2D, the scan line 142 is electrically connected to the gate 112 via the first contact window 122, and the common line 144 is located above the data line 114. Moreover, the source 146 is electrically connected to the data line 114 via the second contact window 124.

Figure 1E:
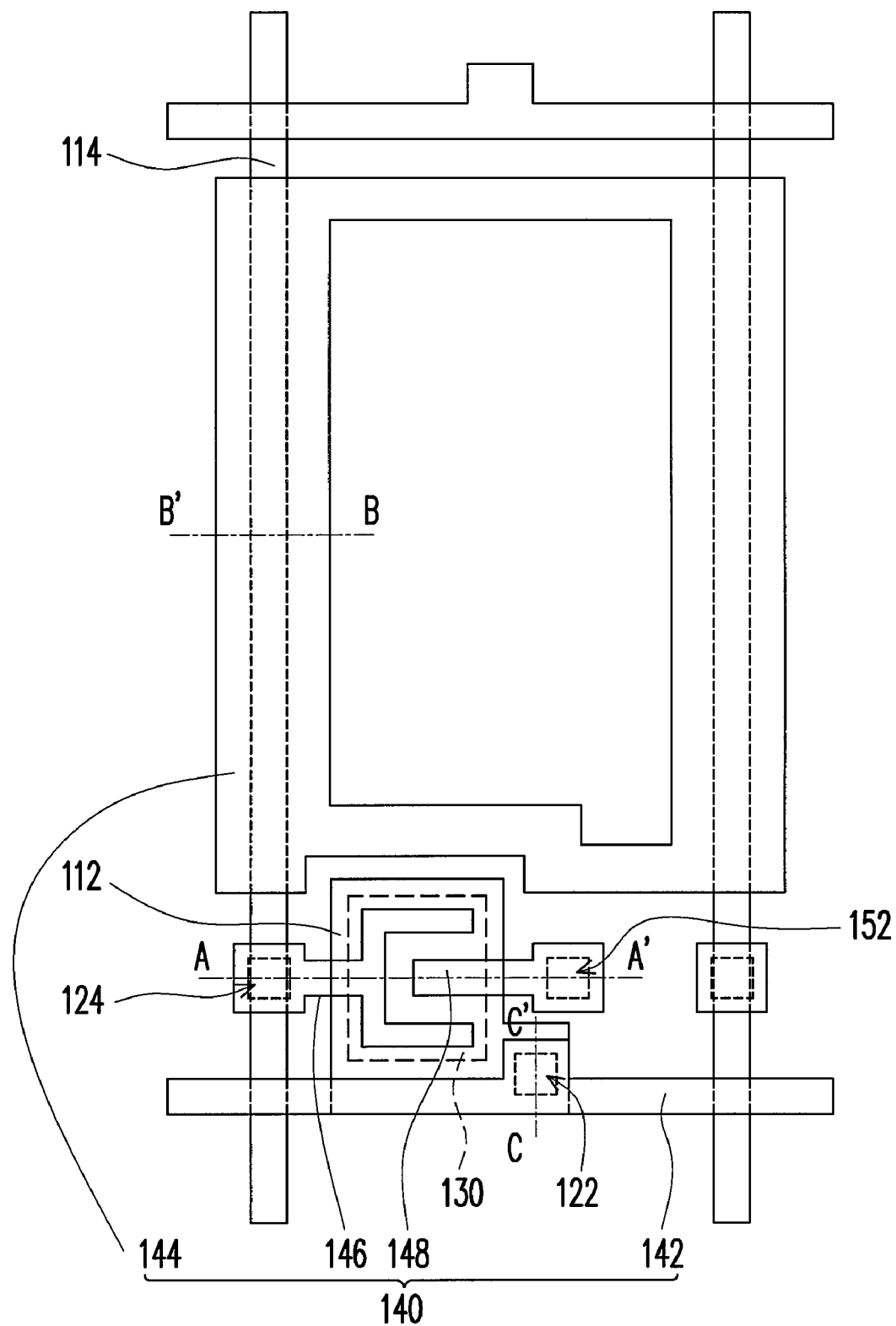

Then, referring to FIGS. 1E and 2E, a passivation layer 150 is formed on the gate insulating layer 120 to cover the second patterned conductive layer 140. The step of forming the passivation layer 150 includes first forming a second dielectric layer (not shown) covering the gate insulating layer 120 and the second patterned conductive layer 140 on the substrate 100, and then forming a third contact window 152 in the second dielectric layer (not shown) to expose a part of the drain 148. In this embodiment, the material of the passivation layer 150 includes silicon dioxide, silicon nitride, or silicon oxynitride.

Figure 1F:
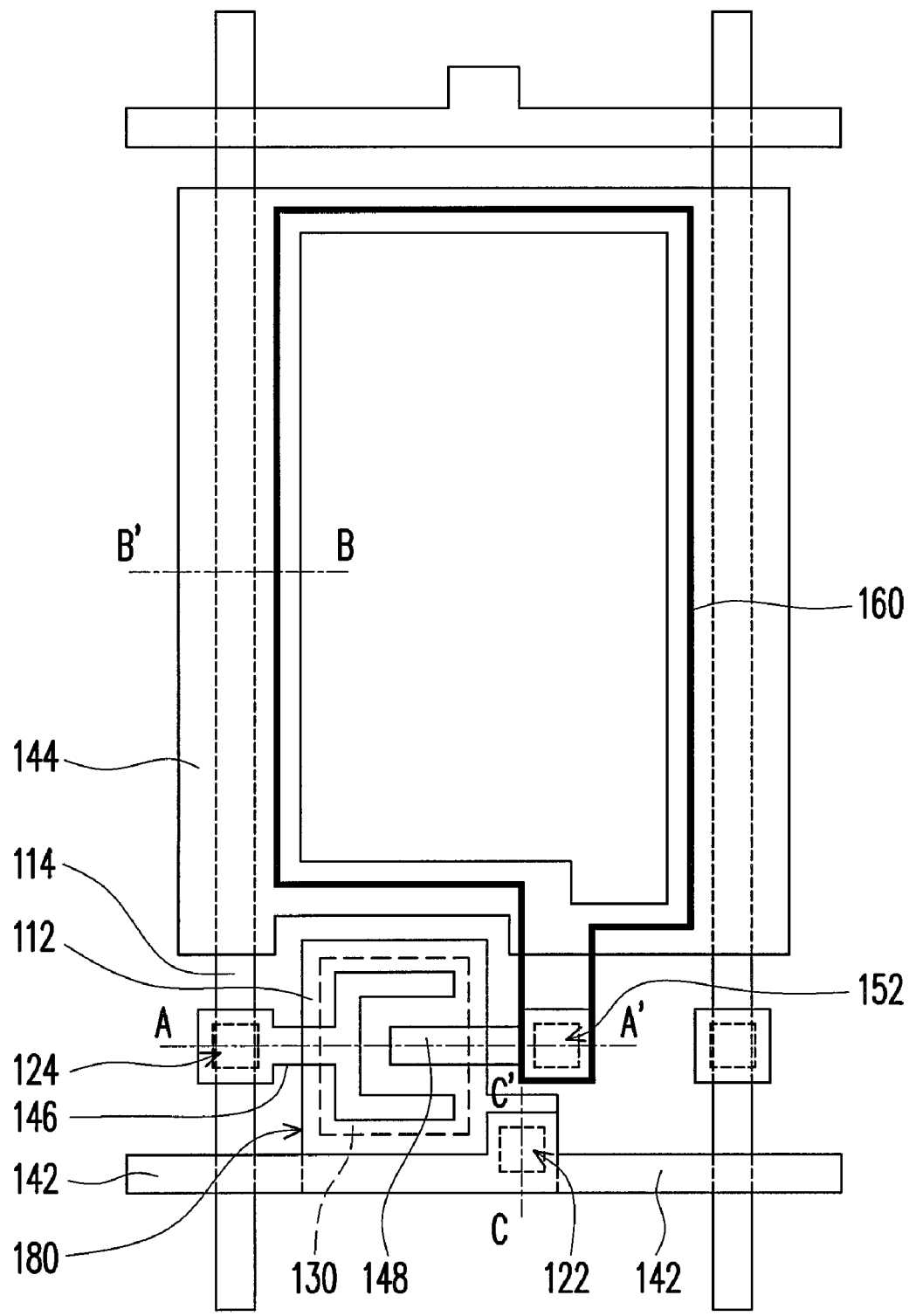

Afterwards, referring to FIGS. 1F and 2F, a pixel electrode 160 electrically connected to the drain 148 via the third contact window 152 is formed on the passivation layer 150. The step of forming the pixel electrode 160 includes, for example, forming a transparent conductive layer (not shown) of indium-tin-oxide, indium-zinc-oxide, or other conductive materials on the passivation layer 150, and patterning the transparent conductive layer (not shown) to form the pixel electrode 160. Moreover, the common line 144 and the pixel electrode 160 are, for example, partially overlapped to form a storage capacitor $C_{st}$.

As shown in FIGS. 1F and 2F, the pixel structure 170 is formed on the substrate 100 and includes the first patterned conductive layer 110, the gate insulating layer 120, the semiconductor channel layer 130, the second patterned conductive layer 140, the passivation layer 150, and the pixel electrode 160. In specific, the gate insulating layer 120 covers the first patterned conductive layer 110. The semiconductor channel layer 130 is formed on the gate insulating layer 120, and the second patterned conductive layer 140 is formed on the gate insulating layer 120 and the semiconductor channel layer 130. Moreover, the passivation layer 150 covers the second patterned conductive layer 140, and the pixel electrode 160 is formed on the passivation layer 150.

In detail, the first patterned conductive layer 110 includes the gate 112 and the data line 114, and the second patterned conductive layer 140 includes the scan line 142, the common line 144, and the source 146 and the drain 148. Meanwhile, the semiconductor channel layer 130 is located above the gate 112, the common line 144 is located above the data line 114, and the source 146 and the drain 148 are located on the semiconductor channel layer 130. Moreover, the gate insulating layer 120, for example, has the first contact window 122 located above the gate 112 and the second contact window 124 located above the data line 114. The scan line 142 is electrically connected to the gate 112 via the first contact window 122, and the source 146 is electrically connected to the data line 114 via the second contact window 124. Moreover, the passivation layer 150, for example, has the third contact window 152, so as to electrically connect the drain 148 and the pixel electrode 160. Overall, the first patterned conductive layer 110, the semiconductor channel layer 130, and the second patterned conductive layer 140 form a thin film transistor 180, and a data line 114 and a scan line 142 which are electrically connected to the thin film transistor 180.

Generally, the shorter the distance between the data line 114 and the pixel electrode 160 is, the larger the effect of capacitance therebetween is, and thus the voltage of the pixel electrode 160 is easily affected by different voltages transmitted by the data line 114, thus resulting in an obvious cross talk. In order to eliminate the influence of the cross talk, the overlapped area between the data line 114 and the pixel electrode 160 is usually reduced, so that the aperture ratio is limited. In the pixel structure 170 of this embodiment, since the common line 144 formed between the data line 114 and the pixel electrode 160 can shield the capacitance coupling effect between the data line 114 and the pixel electrode 160, the arrangement of the pixel electrode 160 is not limited, thus effectively increasing the aperture ratio of the pixel structure 170. Furthermore, the data line 114 constituted by a part of the first patterned conductive layer 110 is a continuous segment, so the break in the data line 114 will not easily occur, which improves the quality of the pixel structure 170.

In this embodiment, the common line 144 and the pixel electrode 160 are partially overlapped to form a storage capacitor $C_{st}$. Meanwhile, it should be noted that the common line 144 is, for example, formed between two neighboring data lines 114 and surrounds the pixel electrode 160 (as shown in FIG. 1F). Therefore, the arrangement of the common line 144 will not decrease the aperture ratio of the pixel structure 170 greatly. When a common voltage is applied to the common line 144 surrounding the edge of the pixel electrode 160, a deformed electric field changing from the edge to the center of the pixel structure 170 may be formed. Thus, if the pixel structure 170 is applied in an LCD panel, the liquid crystal molecules may have a better response, and the liquid crystal molecules may have proper orientation. Definitely, the pixel structure 170 of the present invention is not limited to that the common line 144 surrounds the pixel electrode 160. In other words, common line 114 can also be distributed linearly or in other ways.

Figure 3A:
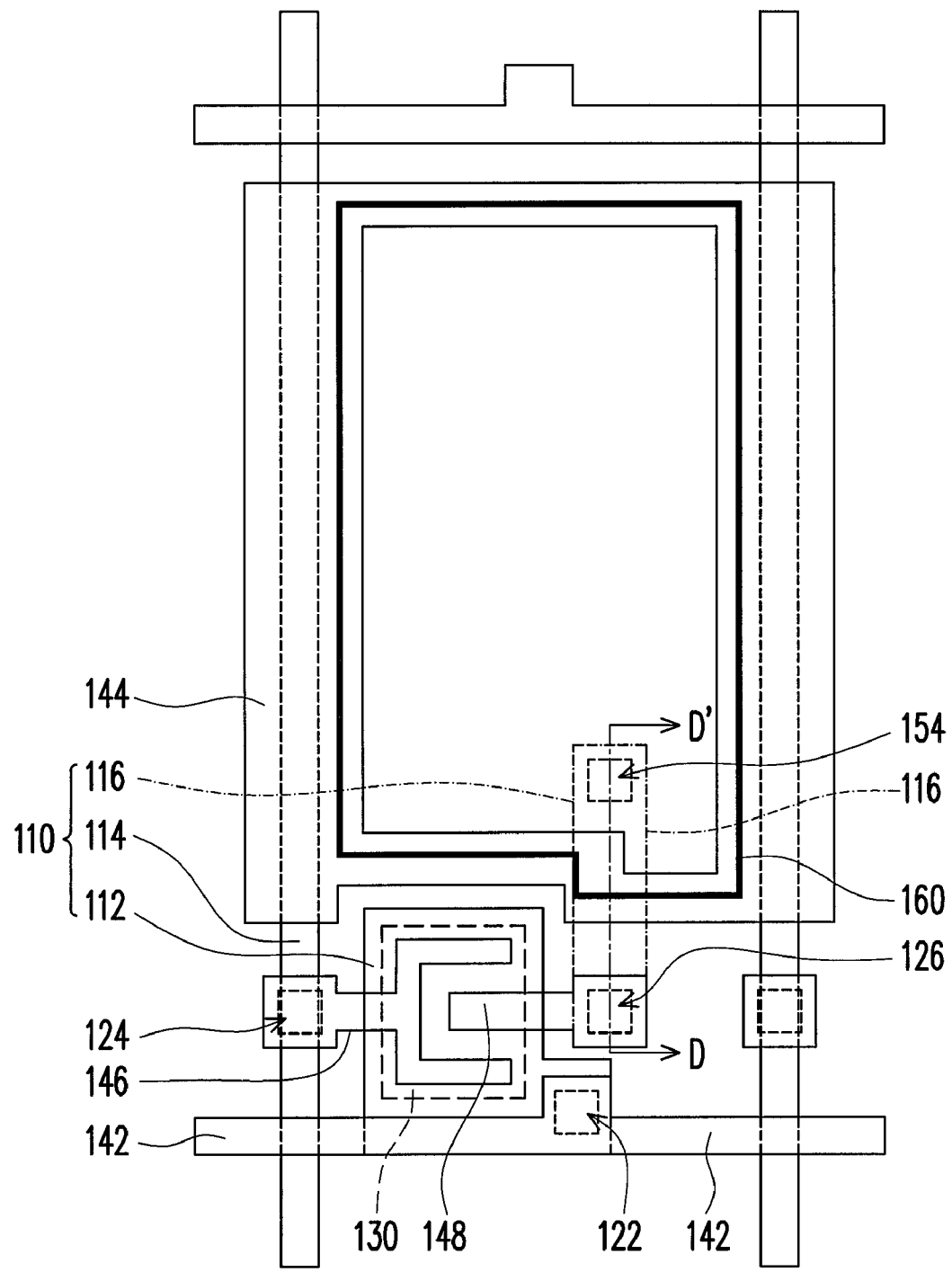
FIG. 3A is a schematic top view of a pixel structure according to another embodiment of the present invention.
Figure 3B:
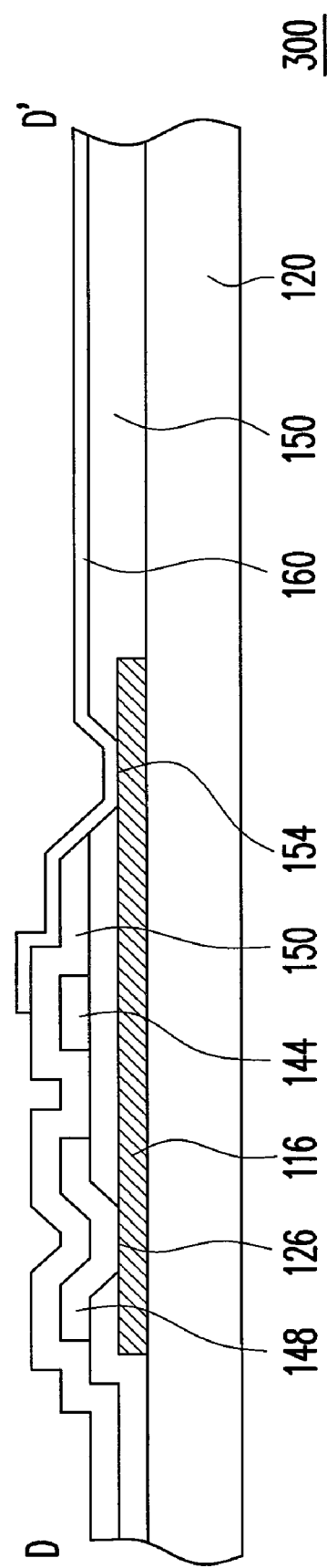
FIG. 3B is a cross-sectional view of FIG. 3A taken along a section line D-D'.

Definitely, the first patterned conductive layer 110, the semiconductor channel layer 130, and the second patterned conductive layer 140 may be connected in other different connecting manners, so as to form the thin film transistor 180 and the data line 114 and the scan line 142 which are electrically connected to the thin film transistor 180. FIG. 3A is a schematic top view of a pixel structure according to another embodiment of the present invention, and FIG. 3B is a cross-sectional view of FIG. 3A taken along a section line D-D'. Referring to FIG. 3A, the elements of the pixel structure 300 are approximately the same as those of the pixel structure 170, and the difference is described as follows. In the pixel structure 300, the first patterned conductive layer 110 further includes a connection layer 116 located below the drain 148 and the pixel electrode 160. Meanwhile, referring to FIGS. 3A and 3B, in the pixel structure 300, a fourth contact window 126 is, for example, formed in the gate insulating layer 120, such that the drain 148 is electrically connected to the connection layer 116 via the fourth contact window 126. Moreover, a fifth contact window 154 is, for example, formed in the passivation layer 150 and the gate insulting layer 120, such that the pixel electrode 160 is electrically connected to the connection layer 116 via the fifth contact window 154. At this time, the drain 148 is, for example, electrically connected to the pixel electrode 160 via the connection layer 116.

In detail, the method of electrically connecting the drain 148 and the pixel electrode 160 in this embodiment includes the following steps. First, when the first patterned conductive layer 110 is formed, the connection layer 116 is formed at one side of the gate 112. That is to say, the connection layer 116 in this embodiment is directly formed on the substrate 100. Moreover, after the semiconductor channel layer 130 is formed and before the second patterned conductive layer 140 is formed, the fourth contact window 126 is formed in the gate insulting layer 120. After the second patterned conductive layer 140 is formed, the drain 148 is electrically connected to the connection layer 116 via the fourth contact window 126. Furthermore, after the passivation layer 150 is formed and before the pixel electrode 160 is formed, the fifth contact window 154 is formed in the passivation layer 150 and the gate insulating layer 120. After the pixel electrode 160 is formed, the pixel electrode 160 is electrically connected to the connection layer 116 via the fifth contact window 154.

When the fourth contact window 126 and the fifth contact window 154 are formed, the contact window (126 or 154) may exceed the range of the connection layer 116 to expose the part of substrate 100 at the periphery of the connection layer 116 due to the mis-alignment in process. After the drain 148 or the pixel electrode 160 is formed, a part of the drain 148 or the pixel electrode 160 is formed on the substrate 100. At this time, a part of the drain 148 and the pixel electrode 160 extends from the upper surface of the connection layer 116 to one side of the connection layer 116 and is still a continuously deposited film. In other words, even if a mis-alignment occurs in the process of forming the contact window (126 or 154), the pixel electrode 160 and the connection layer 116, and the connection layer 116 and the drain 146 are still finely connected. That is, the pixel structure 300 of this embodiment has a high process yield.

Moreover, in this embodiment, the connection layer 116 is located below the annular common line 144, so the surrounding region of the pixel electrode 160 is, for example, affected by the common voltage applied to the common line 144. When the pixel structure 300 is applied in an LCD panel, the common voltage of the common line 144 facilitates the orientation of liquid crystal molecules. Furthermore, when the LCD panel provided with the pixel structure 300 is pressed (e.g. the LCD panel is pressed by a finger), due to the allocation of the common line 144, the liquid crystal molecules restore the correct orientation quickly. That is to say, the design of the pixel structure 300 improves the quality of the LCD panel.

Figure 4:
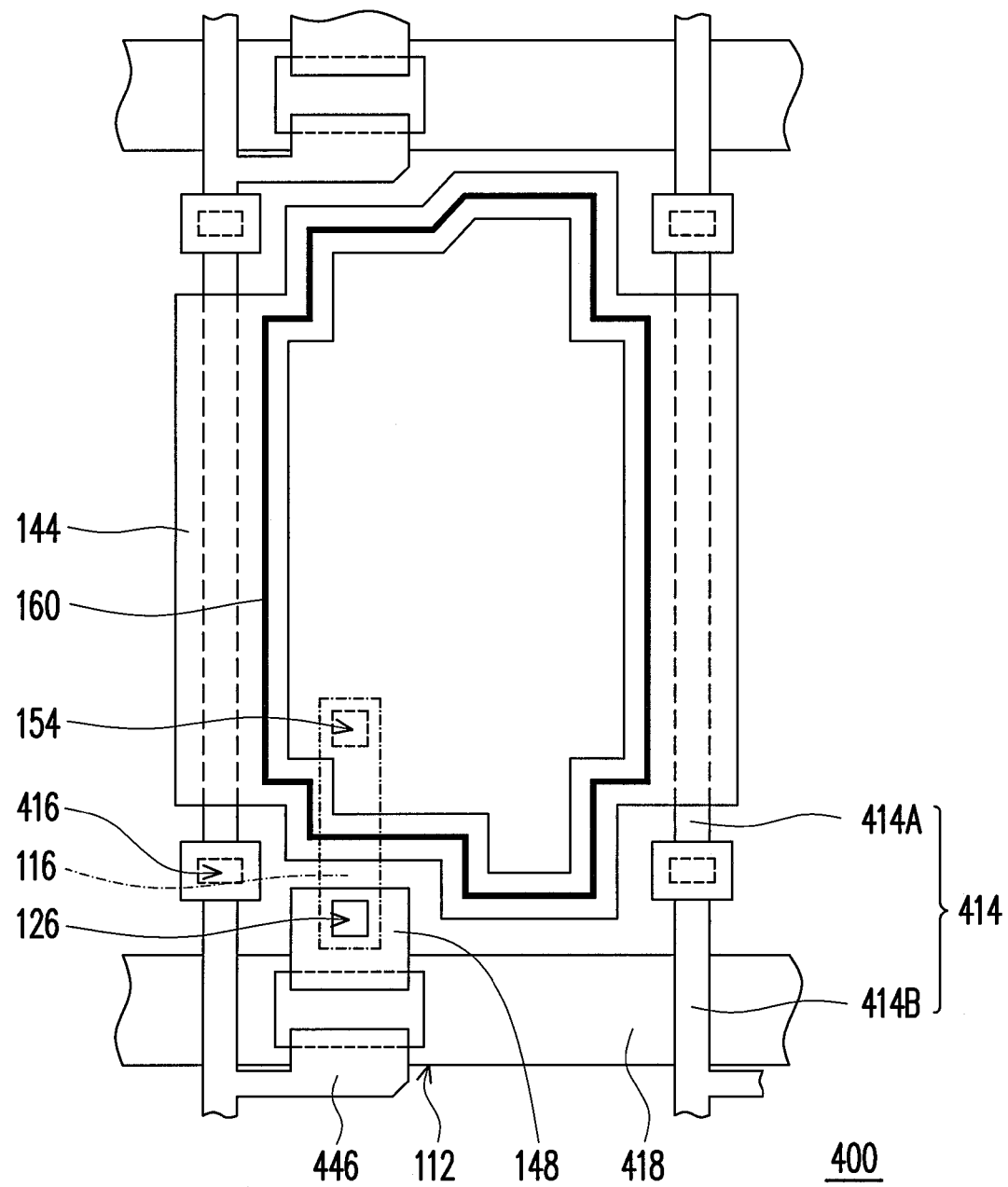
FIG. 4 is a schematic top view of a pixel structure according to another embodiment of the present invention.

Besides, the pixel structure of the present invention can also be designed in other ways. For example, FIG. 4 is a schematic top view of a pixel structure according to another embodiment of the present invention. Referring to FIG. 4, the pixel structure 400 is approximately similar to the pixel structure 300, and the difference is described as follows. The data line 414 of the pixel structure 400 may be divided into two segments. The first segment 414A is constituted by the first patterned conductive layer and the second segment 414B is constituted by the second patterned conductive layer. In other words, the data line of the pixel structure 400 is fabricated by not only one conductive layer.

The first segment 414A is electrically connected to the second segment 414B via a sixth contact window 416, and the source 446 is directly connected to the second segment 414B. That is, the source 446 and the second segment 414B are fabricated by a second patterned metal layer. Moreover, the scan line 418 and the gate 112 in the pixel structure 400 are constituted by the first patterned conductive layer. Meanwhile, the second segment 414B crosses over the scan line 142 and is electrically connected to the first segment 414A. The drain 148 is also electrically connected to the pixel electrode 160 via a connection layer 116. The common line 144 of the pixel structure 400 can also prevent the crosstalk resulted from the signal transmitted through the data line 414, such that the LCD panel has a good quality.

Figure 5:
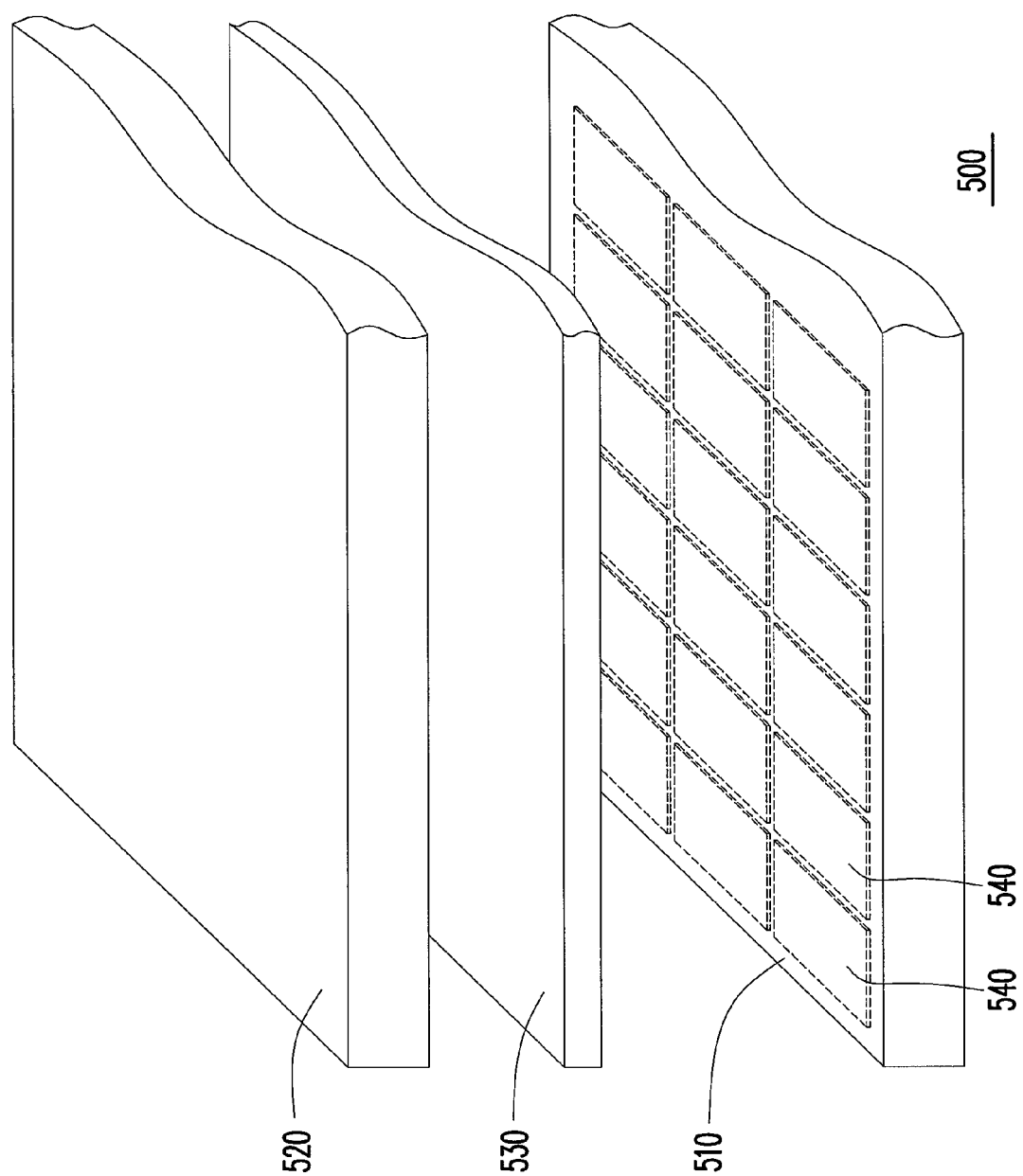
FIG. 5 shows an LCD panel according to an embodiment of the present invention.

FIG. 5 shows an LCD panel according to an embodiment of the present invention. Referring to FIG. 5, the LCD panel 500 includes a first substrate 510, a second substrate 520, and a liquid crystal layer 530. The first substrate 510 includes a plurality of pixel structures 540, and the second substrate 520 is disposed opposite to the first substrate 510. The second substrate 520 is, for example, a color filter. Meanwhile, the liquid crystal layer 530 is disposed between the first substrate 510 and the second substrate 520. The pixel structure 540 is one of the pixel structures described in the above embodiments. The common line is designed to reduce the parasitic capacitance between the pixel electrode and the data line, and also reduce the crosstalk. A conductive layer may be also used in the pixel structure 540 to form the data line, so as to reduce the contact impedance of the data line, so the data transmission quality is quite good. That is, the LCD panel 500 having the pixel structure 540 has a good quality. Meanwhile, the drain and the pixel electrode may be electrically connected via a connection layer in the pixel structure 540, so as to avoid the line break between the drain and the pixel electrode, thus improving the process yield of the LCD panel 500. Furthermore, in the pixel structure of the present invention, the common line is disposed around the pixel electrode, and the common voltage of the common line facilitates the arrangement of the liquid crystal molecules of the liquid crystal layer 530. Particularly, the common voltage of the common line makes the liquid crystal molecules beside the thin film transistor to orient correctly, such that the LCD panel 500 can maintain a good display quality.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. A method of manufacturing a pixel structure, comprising:
    forming a first patterned conductive layer comprising a gate, a connection layer located at one side of the gate and a data line on a substrate;
    forming a gate insulating layer on the substrate to cover the first patterned conductive layer;
    forming a semiconductor channel layer on the gate insulating layer above the gate;
    forming a second patterned conductive layer comprising a scan line, a common line, a source and a drain on the gate insulating layer and the semiconductor channel layer, wherein the scan line is electrically connected to the gate, the common line is located above the data line, the source and the drain are located on the semiconductor channel layer, and the source is electrically connected to the data line;
    forming a passivation layer on the substrate to cover the second patterned conductive layer; and
    forming a pixel electrode on the passivation layer and electrically connected to the drain.

2. The method of manufacturing the pixel structure as claimed in claim 1, wherein the pixel electrode and the common line are partially overlapped to form a storage capacitor.

3. The method of manufacturing the pixel structure as claimed in claim 1, wherein the step of forming the semiconductor channel layer comprises:
    forming a semiconductor layer on the gate insulating layer;
    performing a doping or deposition process to form an ohmic contact layer on an upper surface of the semiconductor layer; and
    patterning the semiconductor layer to form the semiconductor channel layer.

4. The method of manufacturing the pixel structure as claimed in claim 1, wherein the step of forming the gate insulating layer comprises:
    forming a first dielectric layer on the substrate; and
    forming a first contact window and a second contact window in the first dielectric layer to expose a part of the gate and the data line respectively.

5. The method of manufacturing the pixel structure as claimed in claim 4, wherein the scan line is electrically connected to the gate via the first contact window.

6. The method of manufacturing the pixel structure as claimed in claim 4, wherein the source is electrically connected to the data line via the second contact window.

7. The method of manufacturing the pixel structure as claimed in claim 1, wherein the step of forming the passivation layer comprises:
    forming a second dielectric layer on the substrate to cover the second patterned conductive layer; and
    forming a third contact window in the second dielectric layer to expose a part of the drain.

8. The method of manufacturing the pixel structure as claimed in claim 7, wherein the pixel electrode is electrically connected to the drain via the third contact window.

9. The method of manufacturing the pixel structure as claimed in claim 1, further comprising forming a fourth contact window in the gate insulating layer to expose a part of the connection layer after the semiconductor channel layer is formed and before the second patterned conductive layer is formed, such that after the second patterned conductive layer is formed, the drain is electrically connected to the connection layer via the fourth contact window.

10. The method of manufacturing the pixel structure as claimed in claim 1, further comprising forming a fifth contact window in the passivation layer and the gate insulating layer to expose a part of the connection layer after the passivation layer is formed and before the pixel electrode is formed, such that after the pixel electrode is formed, the pixel electrode is electrically connected to the connection layer via the fifth contact window.

* * * * *